Patented Nov. 14, 1950

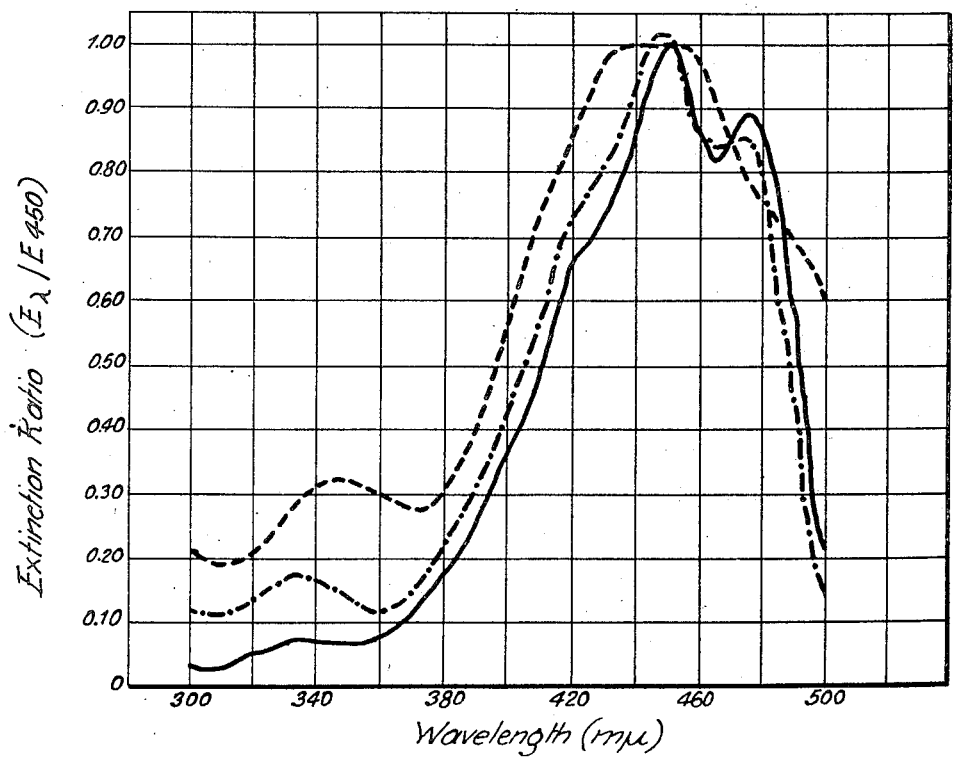
Spectrophotometric Absorption Curves of:
1. A commercially available carotene sample (——)
2. The water-soluble carotene derivative (– – –).
3. The water-soluble carotene derivative after saponification (–·–·–).

2,529,659

UNITED STATES PATENT OFFICE 2,529,659

CAROTENE DERIVATIVE AND METHOD OF PREPARING THE SAME

Daniel Melnick, Flushing, N. Y., assignor, by mesne assignments, to Duffy-Mott Company, Inc., New York, N. Y., a corporation of New York Application August 13, 1947, Serial No. 768,616

12 Claims. (Cl. 99—11)

The above named applicant has made an invention or discovery of which the following is a specification.

This invention relates to a water-soluble carotene derivative and to the production thereof.

The value of carotene is well known. It occurs in many foodstuffs and is referred to as pro-vitamin A. Following ingestion, carotene, a hydrocarbon, is converted into vitamin A, an alcohol. Carotene, particularly the form known as beta-carotene, expressed herein as B-carotene, may be extracted from plant sources and concentrated and made available as a crystalline powder having a carotene content ranging from 70% to 85%. Such a product is valuable for many purposes, but its uses are limited by the fact that it is soluble only in fats or fat solvents.

It is an object of this invention to chemically modify carotene, particularly B-carotene, so that a new water-soluble compound is formed which retains the biological activity of carotene and thereby to extend the possible fields of use of this valuable pro-vitamin A. The resulting carotene derivative may be added to many foodstuffs in which the unmodified carotene could not heretofore be used because it could not be dissolved therein. More particularly an object of the invention is to produce a B-carotene derivative which is soluble in an aqueous medium and especially in an aqueous medium which is acidic and low in protein content.

There have been available for some time substances known as wetting, dispersing or solubilizing agents, but none of them, so far as I am aware, is effective to render carotene soluble when combined therewith in any previously known manner. For example, a group of such substances which would appear to be the most suitable and effective are water-soluble polyoxyalkalene derivatives of partial long-chain fatty acid esters of compounds selected from a group consisting of polyhydric alcohols and their anhydrides. Of the foregoing group, the most suitable would appear to be sorbitan monolaurate (ethylene oxide)$_{20}$ but I have found that it is wholly ineffective under ordinary conditions, such as mixing carotene crystals with an excess thereof and diluting with water or the simulated fruit juice blend hereinafter mentioned.

However, I have discovered that by the procedure hereinafter described, carotene can be converted by chemical reaction to a new compound, a carotene derivative, which is completely soluble in aqueous media, as demonstrated by the following examples.

Example 1

One part by weight of B-carotene in crystalline form and of about 85% purity, was added to 20 parts of sorbitan monolaurate (ethylene oxide)$_{20}$ which had been heated to 150° C. The reaction was allowed to proceed at 150° C. for five minutes under an inert atmosphere of nitrogen and the resulting solution permitted to cool. 180 parts of water was then added and the resulting solution was diluted 1:100 with more water and allowed to stand for an hour. A portion of the clear lower solution was then drawn off and diluted 1:10 for photometric readings. In the Evelyn photoelectric colorimeter using a 440 millimicron filter, a reading of 0.699 indicated that the B-carotene was completely dissolved: no undissolved crystals of carotene being observed.

Example 1a

The foregoing procedure was repeated except that the temperatures to which the monolaurate was heated before adding the carotene thereto, and which were maintained during the reaction of the carotene and monolaurate were different. The temperatures used and the photometric density readings, including the foregoing, were as follows:

| Temperatures of Mixture in Degrees C. | Photometric density of aqueous solution |
|---|---|
| 75 | 0.041 |
| 100 | 0.082 |
| 125 | 0.199 |
| 150 | 0.699 |
| 175 | 0.710 |

The foregoing establishes that at about 150° C. the maximal complete conversion of the carotene was obtained and that there was no advantage in raising the temperature substantially above 150° C. Only by heating the reactants above 100° C. (a procedure generally regarded as destructive of vitamin or pro-vitamin material) could the conversion of the carotene to the water-soluble derivative be initiated. Increasing the temperature accelerated markedly the rate of this reaction until at about 150° C. completion of the reaction was effected.

Example 1b

The procedure of Example 1 was varied by changing the amount of sorbitan monolaurate (ethylene oxide)$_{20}$ in accordance with the following table with corresponding photometric density readings set out in the table. The amount of sorbitan monolaurate (ethylene oxide)20 used in Example 1 is also set forth in the table for the sake of completeness. In all cases one part by weight of 85% purity carotene was used and the preparation of solutions for photometric density readings followed that above described.

| Sorbitan monolaurate (ethylene oxide)20 | Photometric density of aqueous solution |
|---|---|
| Parts by weight | |
| 40 | 0.629 |
| 20 | 0.638 |
| 10 | 0.569 |
| 5 | 0.292 |
| 2.5 | 0.184 |
| 1.25 | 0.086 |

The foregoing indicates that satisfactory results begin to be secured with somewhat less than 10 parts of sorbitan monolaurate (ethylene oxide)20, and that maximum results were secured with about 20 parts of sorbitan monolaurate (ethylene oxide)20.

The foregoing data indicates the formation of a new compound and that in the formation of this compound a condensation reaction has been effected with the formation of water as a volatile by-product. A repetition of the foregoing procedure, but under conditions which prevented water loss (namely, adding the water to the reactants, sealing the vessel, and heating the mixture at 150° C. for periods extending up to one hour) yielded a product with undissolved particles of carotene floating on the surface and clinging to the walls of the test tube.

Further evidence that a new compound had been produced was derived from spectrophotometric studies conducted on the water-soluble carotene derivative before and after saponification. Referring to the accompanying drawing it will be seen that three absorption curves are plotted thereon. The curve for the commercially available carotene sample used in this study agrees well with that of pure B-carotene (Official and Tentative Methods of Analysis of the Association of Official Agricultural Chemists, 1946). The spectrophotometric absorption curve of the water-soluble carotene derivative is markedly different from that of the original carotene. The principal differences are higher extinction ratios in the region of 300 to 450 mm., a broad plateau in the absorption maximum from 435 to 455 mm., and the absence of an absorption peak at 475 mm. in the case of the water-soluble carotene complex. When this material was saponified, another compound was formed, more closely approximating that of the original carotene, but even here there are differences; the absorption curve is displaced approximately 5 mm. toward the lower wavelength region. Saponification of the original carotene effected no change in the light absorption curve.

In all these tests the Beckman spectrophotometer was first set to 100% transmission at each of the wave length settings using the appropriate solvents. Another control test involved saponification of an unheated mixture of carotene and sorbitan monolaurate (ethylene oxide)20; the absorption curve of the solution was exactly the same as that of the original carotene.

By supplementing the curves with the extinction coefficient values at the maximum, one has access to all the pertinent spectrophotometric absorption data. Listed below are the extinction coefficients of the three test systems at 450 mm.

| Test System | $E_1^{1\%}$ cm. 450 mm. |
|---|---|
| Commercially available carotene sample in petroleum ether | 2,130 |
| Water-soluble carotene derivative in the sugar-acid solution | 808 |
| Water-soluble carotene derivative after saponification and solution in petroleum ether | 1,057 |

These data demonstrate that the water-soluble derivative absorbs appreciably less light at 450 mm. than the original carotene, that following saponification another compound is formed (reflected in the change in the absorption curve) and that this new compound absorbs more light at 450 mm. than the modified carotene.

Whereas carotene suspended in pure water or in water containing the added sorbitan monolaurate (ethylene oxide)20 in the proportions mentioned above, is very soluble in petroleum ether, the water-soluble derivative produced according to this invention is practically insoluble in this organic solvent. This was demonstrated by observations made on the supernatant organic solvent following agitation of the water petroleum ether mixture.

*Example 2*

The procedure of Example 1 was repeated except that instead of using water as a diluent an aqueous medium simulating a fruit juice in chemical characteristics was used. This was desirable in order to provide a colorless medium which could be subjected to photometric reading without distortion due to pigments derived from fruits.

The simulated fruit juice blend was prepared in the following manner. 5 grams of malic acid and 160 grams of sucrose were dissolved in water and sufficient sodium hydroxide solution added to bring the pH to 3.6 and the weight then brought to 1000 grams with water. When this simulated fruit juice was used in place of water, the observations and results were the same as in the case of water, indicating conclusively that the carotene derivative produced according to the procedure of Example 1 was soluble in such a simulated fruit juice to the same extent and in the same manner as it was in water.

*Example 3*

The procedure of Example 1 was repeated except that instead of using water as a diluent a fruit juice blend was employed. The latter was prepared according to the formula given below.

| Ingredient | Per Cent |
|---|---|
| Apple juice | 19 |
| Prune juice | 19 |
| Sucrose solution (19° Brix) | 18 |
| Grapefruit juice | 14 |
| Orange juice | 10 |
| Grape juice | 10 |
| Pineapple juice | 5 |
| Apricot nectar | 5 |
| Total | 100 |

The pH of this blend was 3.5, the Brix reading 15.9°, and the specific gravity 1.06.

When this fruit juice blend was used in place of water as the solvent for the carotene derivative, complete solution was effected. Because the pigmentation of the fruit juice blend made it impossible to take photometric readings as in the case of the water or the simulated fruit juice used in the previous examples a different test was adopted. It was first established that when a carotene fortified fruit juice, with or without added sorbitan monolaurate (ethylene oxide)20 is allowed to stand undisturbed for a period of several days, the insoluble carotene crystals will float to the surface and be easily detected by an orange ring in the neck of the flask. Then it was found that in the case of the fruit juice fortified with water-soluble carotene derivative, no such ring could be observed even with fortified juices that had been allowed to stand for periods of more than six months.

The addition of other vitamins which are water-soluble presents no problem, and, if desired, a fruit juice fortified with the hereinabove described carotene derivative may have added to it other vitamins in proper proportions, such as thiamine (vitamin B), riboflavin (Vitamin $B_2$), ascorbic acid (vitamin C), and niacinamide (the anti-pellagra vitamin).

Biological assays undertaken to establish that the hereinabove carotene derivative has substantially the biological effects of unmodified carotene will now be described.

The above mentioned fruit juice blend itself contains insignificant quantities of vitamin A as the pro-vitamin carotene. Biological assays conducted on the fruit juice fortified with the water-soluble carotene derivative using the U. S. P. rat assay procedure, demonstrated that the conversion of carotene to this new compound was effected without appreciable loss in biological activity. It was found that 0.825 microgram of the new compound, expressed as carotene, was equivalent to 1 U. S. P. unit of vitamin A.

The fortified fruit juice contained 43 micrograms of the original carotene (calculated to 100% purity) per milliliter. It was fed to a group of seven vitamin A deficient rats at an assumed level of 45 U. S. P. units of vitamin A per milliliter. This necessitated feeding 0.033 ml. of the sample to each animal each day. Two other groups of rats, seven animals in each, were fed the U. S. P. reference oil, one receiving 1.5 U. S. P. units of vitamin A per rat per day, the other 2.2 U. S. P. units of vitamin A per rat per day. The average net gains in weight of the animals in these three groups during the assay period, were 45.9, 38.9 and 57.4 grams respectively. The growth response of the animals dosed with the fortified fruit juice indicated that the sample contained 52.1 U. S. P. units of vitamin A per milliliter; i. e. 0.825 microgram of the water-soluble carotene derivative (expressed as carotene) equalled 1 U. S. P. unit of vitamin A. 0.6 microgram of pure beta-carotene is regarded to be equal to 1 U. S. P. unit of vitamin A. Whereas the efficiency with which the water-soluble carotene derivative is converted to vitamin A in the animal organism is somewhat less than that obtained with pure recrystallized beta-carotene of 100% purity, it is superior to that noted when the natural carotenes in fruits and vegetables are fed to vitamin A deficient rats.

I claim as my invention:

1. As a new composition of matter, the condensation product of carotene and sorbitan monolaurate (ethylene oxide)20 characterized by its spectrophotometric curve having a broad plateau in the absorption maximum at a wave length of from 435 to 455 millimicrons and the absence of an absorption peak at a wave length of 475 millimicrons.

2. A composition of matter in accordance with claim 1 wherein the product is a condensation of 1 part of the carotene and from 10–40 parts of the sorbitan monolaurate (ethylene oxide)20.

3. A composition of matter in accordance with claim 1 wherein the product is the condensation of 1 part of the carotene and approximately 10 parts of the sorbitan monolaurate (ethylene oxide)20.

4. A composition of matter comprising the condensation product of carotene and sorbitan monolaurate (ethylene oxide)20 as defined in claim 1 dissolved in an aqueous medium and having the biological activity of carotene.

5. A composition of matter comprising the condensation product of carotene and sorbitan monolaurate (ethylene oxide)20 as defined in claim 1 dissolved in an aqueous medium of about 3.5 pH and having the biological activity of carotene.

6. A composition of matter comprising the condensation product of carotene and sorbitan monolaurate (ethylene oxide)20 as defined in claim 1 dissolved in fruit juice and having the biological activity of carotene.

7. Method of preparing a water-soluble product having vitamin A activity which comprises reacting carotene with sorbitan monolaurate (ethylene oxide)20 at a temperature above 125° C. but not substantially above 175° C. for a few minutes.

8. Method in accordance with claim 7 wherein 1 part of carotene is reacted with from 10–40 parts of sorbitan monolaurate (ethylene oxide)20.

9. Method in accordance with claim 7 wherein the reaction is carried out at a temperature of about 150° C.

10. Method in accordance with claim 7 wherein the reaction is carried out in a non-oxidizing atmosphere at a temperature of about 150° C.

11. The method of converting carotene to a water-soluble compound which consists in bringing together carotene and sorbitan monolaurate (ethylene oxid)20, heating to about 150° C. to bring about a reaction while protecting the carotene reactant with a non-oxidizing gas, and maintaining the temperature for a sufficient length of time to permit the evaporation of water formed as a by-product of the reaction.

12. The method of converting carotene to a water-soluble compound which consists in bringing together carotene and sorbitan monolaurate (ethylene oxid)20, heating to about 150° C. to bring about a reaction while protecting the carotene reactant with a non-oxidizing gas, and maintaining the temperature for about five minutes.

DANIEL MELNICK.

REFERENCES CITED

The following references are of record in the file of this patent:

UNITED STATES PATENTS

| Number | Name | Date |
|---|---|---|
| 2,407,624 | Bird | Sept. 17, 1946 |
| 2,417,299 | Freedman et al. | Mar. 11, 1947 |